Figure 2:
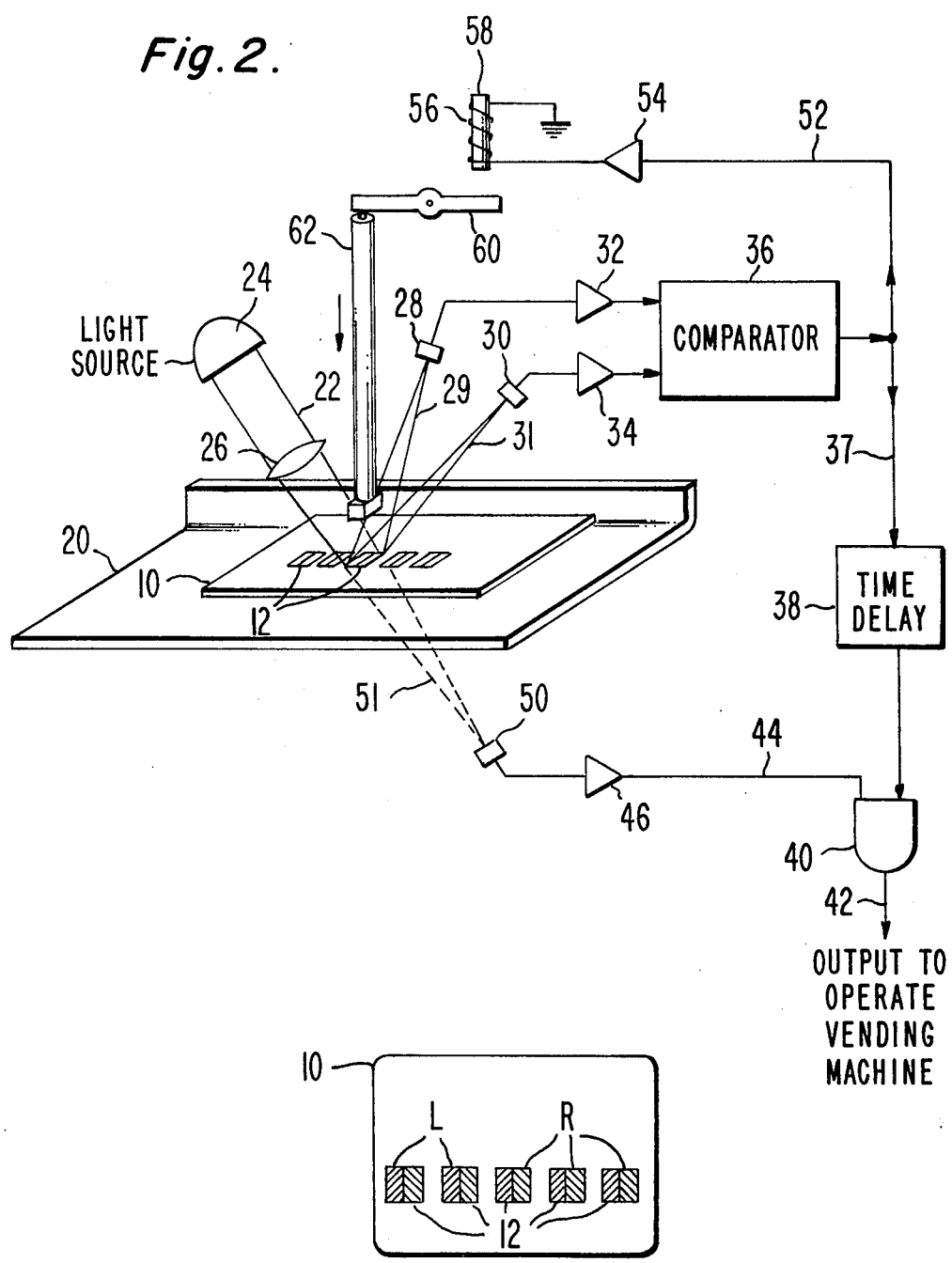

United States Patent [19]

Hannan

[11] 4,108,367

[45] Aug. 22, 1978

[54] TOKEN AND READER FOR VENDING MACHINES

[75] Inventor: William James Hannan, Concord, Mass.

[73] Assignee: RCA Corporation, New York, N.Y.

[21] Appl. No.: 772,103

[22] Filed: Feb. 25, 1977

[51] Int. Cl.² .................. G06K 7/10; G06K 19/06; G03H 1/26; G11C 13/04

[52] U.S. Cl. .................. 235/457; 235/485; 350/3.75; 365/216

[58] Field of Search .......... 235/61, 12 N, 61.11 E, 235/61.7 R, 61.7 B, 454, 457; 194/4 R, 4 F; 340/173 LM; 350/3.5; 365/216

[56] References Cited

U.S. PATENT DOCUMENTS 3,936,139  2/1976  Huignard et al. ............ 340/173 LM
4,023,010  5/1977  Horst et al. ................. 235/61.11 E Primary Examiner—Daryl W. Cook
Attorney, Agent, or Firm—H. Christoffersen; Samuel Cohen; Carl V. Olson

[57] ABSTRACT

A token for use in a vending machine consists of a plastic card having at least one pair of side-by-side holograms embossed thereon. A token reader includes means to guide a token into the path of a readout beam. When two photodetectors positioned at predetermined spaced locations receive equal-amplitude first order beams from an illuminated pair of holograms, an electrically-operated plunger in the token reader operates to obliterate the pair of holograms on the token, and then a signal from a third photodetector in the token reader enables an output signal for operating the vending machine.

4 Claims, 2 Drawing Figures

TOKEN AND READER FOR VENDING MACHINES

There are known systems in which cards or tokens are provided with magnetic recordings representing money credits. The tokens are read by token readers which recognize a magnetically recorded credit, enable a vending machine, and then erase the magnetically recorded credit after it is thus used. The known magnetic tokens are expensive and easily counterfeited, and the magnetic token readers are expensive.

An improved system according to the invention employs tokens in the form of plastic cards having holograms embossed thereon, and a token reader which recognizes a holographic credit on the card, and generates a signal for enabling the vending machine after obliterating the holographic credit.

In the drawing

Figure 1:
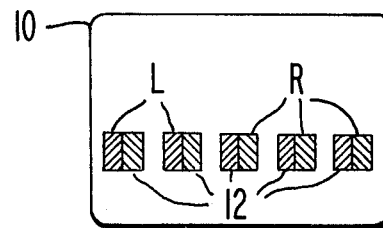

FIG. 1 is a diagram of a plastic token card embossed with pairs of holograms representing credits; and FIG. 2 is a schematic showing of a token reader for recognising credits on a token, obliterating the spent credit from the token, and the enabling a vending machine.

The token shown in FIG. 1 may be a plastic card 10 having embossed thereon a plurality of pairs 12 of holograms representing credits useful in operating a vending machine. Each pair of holograms includes a left-hand hologram L consisting of embossed diffraction grating lines at one angle, and an adjacent right-hand hologram R consisting of embossed diffraction grating lines at a different angle. Each embossed diffraction grating is the equivalent of a Fraunhofer hologram produced by the interference pattern of two plane waves, one from a source of a reference beam and the other from an object beam produced by a point source of light located at the focal point of a lens. When a readout beam is directed to a pair of holograms on card 10, first order beams are diffracted from the two holograms in different directions determined by the angles of the diffraction lines of the holograms.

The token reader shown in FIG. 2 includes a guide 20 along which the token card 10 is moved to effect a reading of a credit-representing pair of holograms on the card. A holographic readout light beam 22 is provided by a light source 24 and a lens 26. Two photodetectors 28 and 30 are positioned to receive the beams 29 and 31 from the left-hand hologram, and the right-hand hologram, respectively, of one pair 12 of holograms. The photodetectors are positioned to receive first order beams diffracted solely from holographic diffraction grating lines at the predetermined angles chosen in making the token card. The card reader will not respond to a card which has diffraction lines at other predetermined angles and which is intended to be used with a different card reader. Successive pairs of holograms on a card may be different and designed to release items of one kind from one vending machine, and items of another kind from another vending machine, respectively.

The electrical outputs of photodetectors 28 and 30 are applied through respective amplifiers 32 and 34 to a comparator 36. The output of the comparator is applied through a latch or time delay unit 38 and "and" gate 40 to an output lead 42 which is connected to operate a vending machine (not shown) or other utilization device. An output is provided at 42 from gate 40 only when the gate is enabled over line 44 from an amplifier 46 which receives the electrical output from a third photodetector 50. Photodetector 50 receives light along path 51 directly from the readout light beam 22 only when the light beam 22 passes through the token card 10 as the result of an obliteration or cancellation of the credit-representing pair of holograms.

Cancellation of a pair of holograms 12 is accomplished by an output of comparator 36 applied over line 52 to an amplifier 54 which supplies operating current to a solenoid 56 wound on a core 58 of magnetizable material. Energization of the solenoid causes one end of a pivoted linkage 60 to be pulled toward the core 58, and causes the other end of the linkage to drive a punch 62 against and through a pair of holograms on the token card 10. Alternatively, the punch 62 may be heated and operative to flatten the embossed diffraction ridges on the plastic token card 10. In either case, the operation of the punch 62 obliterates or cancels a credit-representing pair of holograms, and permits the readout beam 22 to pass through the card to the photodetector 50.

In operation, a token card 10 is passed along the guide 20 so that the pairs 12 of holographic credits, if present on the card, will sequentially come under the readout beam 22. When the card reaches a position in which the readout beam equally illuminates two holograms of a pair, equal electrical signals having amplitudes above a predetermined threshold value are produced by photodetectors 28 and 30, and the equality and amplitude of the signals is recognized by the comparator 36. An output on line 52 from the comparator 36 actuates the solenoid 56 and causes the punch 62 to obliterate the pair of holograms which caused the readout light to be diffracted to the photodetectors 28 and 30. Thereafter, light of the readout beam 22 is permitted to pass to the third photodetector 50, which produces a signal that enables "and" gate 40. In the meantime, the original output on line 37 from comparator 36 is delayed by time delay unit 38 an amount such that the output of unit 38 arrives at the input of gate 40 at the same time as the enabling signal arrives over line 44 from the third photodetector 50. Time delay unit can be a storage means such as a flip-flop with automatic reset after some fixed period, or reset by, say, removal of the token card from the machine. The output signal from gate 40 on line 42 thus operates the vending machine only after the pair of holograms being used is cancelled to prevent its re-use. The remaining holographic credits may be "spent" on future occasions, as desired, until all credits are obliterated and the token card can be discarded.

What is claimed is:

1. A token reader, comprising means producing a holographic readout beam, means to guide a token containing a plurality of pairs of holograms into the path of said readout beam, two photodetectors positioned at predetermined spaced locations to receive respective first order beams from the holograms of an illuminated pair of holograms, an electrically-operated means for obliterating a pair of holograms on said token which are positioned in the path of said readout beam, and comparator means operative upon the occurrence of equality of electrical outputs of said two photodetectors to actuate said means for obliterating holograms.

2. A token reader as defined by claim 1 in which said means for obliterating holograms includes a plunger.

3. A token reader as defined by claim 1, and in addition, a third photodetector positioned to receive light of said holographic readout beam which passes through an obliterated pair of holograms.

4. A token reader as defined by claim 3, and in addition, gate means operative upon the sequential occurrence of an output from said comparator means and an output from said third photodetector to provide an output signal for operating a vending machine.

* * * * *